(12) United States Patent
Sanders

(10) Patent No.: US 11,711,220 B1
(45) Date of Patent: Jul. 25, 2023

(54) SYSTEM AND METHODS FOR COMPUTATION, STORAGE, AND CONSENSUS IN DISTRIBUTED SYSTEMS

(71) Applicant: Brandon Michael Sanders, Webster Grove, MO (US)

(72) Inventor: Brandon Michael Sanders, Webster Grove, MO (US)

(73) Assignee: Alicorn Systems, Inc., Worcester, MA (US)

( * ) Notice: Subject to any disclaimer, the term of this patent is extended or adjusted under 35 U.S.C. 154(b) by 250 days.

(21) Appl. No.: 17/091,617

(22) Filed: Nov. 6, 2020

Related U.S. Application Data

(60) Provisional application No. 62/932,862, filed on Nov. 8, 2019.

(51) Int. Cl.
*H04L 29/06* (2006.01)
*H04L 9/32* (2006.01)
*H04L 67/104* (2022.01)
*H04L 67/1097* (2022.01)
*G06F 21/64* (2013.01)
*H04L 9/08* (2006.01)
(Continued)

(52) U.S. Cl.
CPC .......... *H04L 9/3247* (2013.01); *G06F 21/64* (2013.01); *H04L 9/0637* (2013.01); *H04L 9/0866* (2013.01); *H04L 67/1046* (2013.01); *H04L 67/1097* (2013.01); *H04L 9/50* (2022.05)

(58) Field of Classification Search
CPC ... H04L 9/3247; H04L 9/0637; H04L 9/0866; H04L 67/1046; H04L 67/1097; H04L 9/50; G06F 21/64
See application file for complete search history.

(56) References Cited

U.S. PATENT DOCUMENTS

| 10,255,108 B2 * | 4/2019 | Dillenberger ....... G06F 16/9024 |
| 10,630,463 B2 * | 4/2020 | Mankovskii .......... H04L 9/3239 |
| 2017/0208045 A1 * | 7/2017 | Huh ...................... H04L 9/0841 |

(Continued)

FOREIGN PATENT DOCUMENTS

| CN | 109544344 | * 3/2019 |
| CN | 111274597 | * 12/2020 |

OTHER PUBLICATIONS

Danezis et al. "Blockmania: from Block DAGs to Consensus", https://arxiv.org/pdf/1809.01620.pdf; Sep. 2018 (Year: 2018).*

*Primary Examiner* — Taghi T Arani
*Assistant Examiner* — Lin Chang
(74) *Attorney, Agent, or Firm* — Clocktower Law LLC; Erik J. Heels; Michael A. Bartley

(57) ABSTRACT

From the enterprise cloud to robot swarms, distributed systems are everywhere. However, because these systems are realized through the careful coupling of disparate technologies (e.g., databases, messaging systems, and application runtimes), they are difficult to create and maintain—even for experienced engineers. This is a problem because the engineers of these systems have to work harder, be better trained, and thus cost more to employ, making it harder to create new products and inventions. A solution herein is a Data Backbone that provides a single medium for processing, storing, and sharing data in near-real-time. By combining these features into a single medium, the Data Backbone consolidates the functionality of several disparate tools into one system.

9 Claims, 8 Drawing Sheets

(51) Int. Cl.
   *H04L 9/06*      (2006.01)
   *H04L 9/00*      (2022.01)

(56) References Cited

U.S. PATENT DOCUMENTS

2019/0303579 A1* 10/2019 Reddy .................. H04L 9/50
2019/0354518 A1* 11/2019 Zochowski ......... G06F 16/2379
2020/0143366 A1*  5/2020 Liu ..................... G06F 16/9024
2021/0091957 A1*  3/2021 Ford ..................... H04L 9/0643
2022/0100724 A1*  3/2022 Zhang .................. G06F 16/22

* cited by examiner

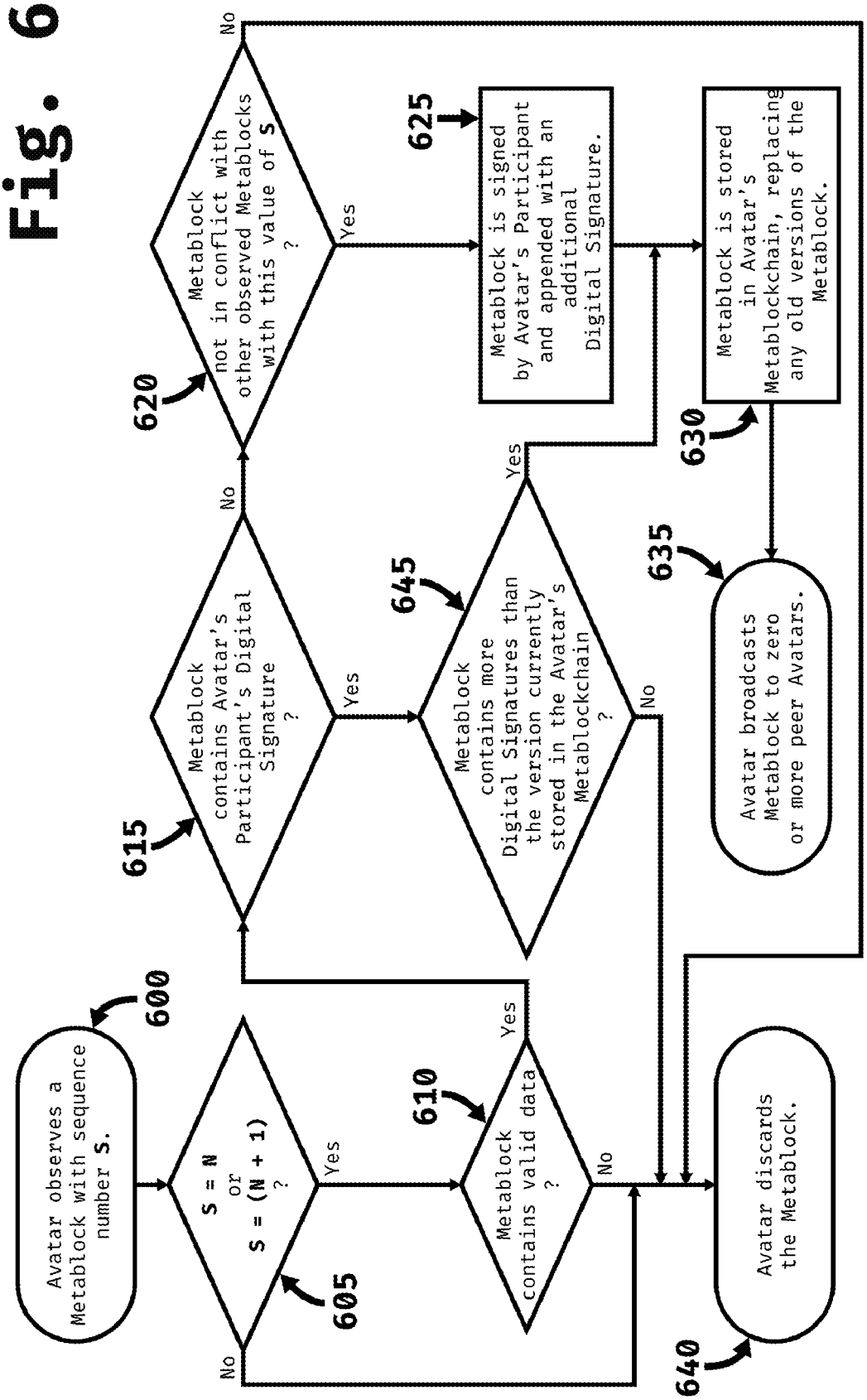

Fig. 7

Saga State — 720

| | |
|---|---|
| previousState | A Reference to a Saga State. |
| stage | A Reference to a Saga Stage. |
| consumedEntry | A Reference to an Entry. |
| producedEntries | A list of References to zero or more Entries. |
| sagaDescription | A Reference to a Saga Description. |

Saga Stage — 710

| | |
|---|---|
| behavior | A Reference to a Behavior. |
| consumedPact | A Reference to a Pact. |
| accessedPacts | A list of References to zero or more Pacts. |
| producedPacts | A list of References to zero or more Pacts. |

Saga Description — 700

| | |
|---|---|
| stages | An ordered list of References to one or more Saga Stages. |
| initiatingPact | A Reference to a Pact. |
| statePact | A Reference to a Pact comprising the fields of a Saga State. |

SYSTEM AND METHODS FOR COMPUTATION, STORAGE, AND CONSENSUS IN DISTRIBUTED SYSTEMS

CROSS-REFERENCE TO RELATED APPLICATIONS

This utility patent application claims priority from U.S. provisional patent application Ser. No. 62/932,862, filed Nov. 8, 2019, titled "Method and System for Aggregating Computation, Storage, and Consensus in Distributed Systems", and naming inventor Brandon Michael Sanders.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2020, Brandon Sanders.

BACKGROUND

Field of Technology

The systems and methods disclosed herein relates to distributed systems.

Background

Existing container orchestration technologies (e.g., Kubernetes, Argo, and Docker Swarm) are designed to coordinate the provisioning and execution of virtual machines or containers. However, these technologies are less concerned with the management of data, and more concerned with the management (not the creation) of hardware resources and Distributed Applications (e.g., pre-defined processes or programs which may execute on one or more computers and/or systems in parallel, preferably in an orchestrated or coordinated way), making them only a small piece of a greater distributed system solution.

Distributed database technologies (e.g., Aerospike, Snowflake, Firebase, and MongoDB) provide fast, reliable, and high-volume data storage and security, but they are not designed to aid engineers in the development of Distributed Applications.

Messaging system technologies (e.g., Protocol Buffers, DDS, and Kafka) provide tools for describing, ingesting, and routing data between members of a distributed system, but they often integrate only loosely with application runtimes. Furthermore, these technologies do not typically address the issue of storing data long-term or creating and/or applying Distributed Applications to process data.

In-memory data grid technologies (e.g., Apache Beam, Apache Cassandra, Apache Airflow, Hazelcast, and Apache Hadoop) provide mechanisms for storing data, distributing data between Peers in a distributed network of systems, and, to a limited degree, creating and/or applying Distributed Applications process to data. However, these technologies do not typically provide long-term data storage solutions or complete runtimes for executing complex Distributed Applications.

Distributed actor frameworks (e.g., Akka and Microsoft Orleans) provide mechanisms for storing data, distributing data between Peers in a distributed network of systems, and executing complex Distributed Applications. However, these technologies do not typically provide long-term data storage solutions without additional technologies (e.g., distributed databases), and do not typically provide mechanisms for achieving distributed consensus on data and Distributed Application state.

Distributed ledger technologies (e.g., Bitcoin, Ethereum, Iota, and Algorand) provide data storage and consensus mechanisms using a "trustless" model. However, many of these technologies are infamous for their complex (or absent) Distributed Application runtimes, impractically slow runtime performance, and/or poor linear scalability, making them unideal for most forms of distributed systems in use today.

Web application frameworks such as Spring or Micronaut provide—whether directly or through integrations—nearly complete ecosystems for creating Distributed Applications for specific categories of distributed systems (web services). However, they often do so by requiring engineers to combine multiple disparate technologies, and thus become less performant, become more complicated to use as the scope and scale of an application grows, and become one complex system comprised of many disparate systems.

None of the above provides a system with 1) data storage, 2) data consensus, 3) the ability to discover and access data regardless of its physical or logical location, 4) linear scalability (i.e., the performance of individual Data Backbone Participants does not significantly degrade in relation to the number of Participants in the Data Backbone), and 5) a runtime for executing complex Distributed Applications. What is needed, therefore, is a system that combines the features enumerated above.

BRIEF SUMMARY

The method and system disclosed herein is a complete Data Backbone that provides a single medium for processing, storing, and sharing data in near-real-time. By combining these commonly disparate features into a single medium, the Data Backbone allows practitioners to use only one system to create a complete distributed system. This combination lends itself to implementations of the method and system disclosed herein based on a tiered architecture that uses a common data format capable of achieving high data throughput, low latency, and linear scalability. A key enabling technology of the Data Backbone is a Blockchain technology called a Metablockchain, which is based in turn on a data structure called a SIC-DAG.

Features and Advantages

Single System
    Because the method and system disclosed herein combines these features into a single system, it immediately gains two advantages over the prior art: 1) The number of tools and technologies needed to develop, deploy, and support a distributed system is potentially reduced to just one tool. This simplification lowers the time-to-market for new businesses and reduces the amount of expertise required to support a system, and 2) By sharing a common data format across every layer of the system, the Data Backbone avoids the often costly (in both time and hardware resources) conversion of data between different systems and their data formats. Both of these advantages reduce the mental burden and skill requirements of individual engineers, in turn reducing the cost to acquire, train, and retain engineering talent in organizations.

Spatial-Temporal Performance

The architecture of the method and system disclosed herein separates data into three logical "layers": 1) When data is first created or accessed, it enters a low-latency, high-throughput buffer that can support hundreds of thousands of messages per second per Participant, 2) As the buffer fills, it is drained into Blocks of messages that are digitally signed and distributed between Participants, and 3) When enough Blocks are created, their identities are recorded and ordered by the Data Backbone network within Metablocks.

This layering adds spatial and temporal characteristics to data: When data is young and not very distributed, it is very quick and easy to access or modify it. However, as data ages, it becomes slower to access and harder to modify. These characteristics reflect the underlying usage patterns of many distributed systems, which rely on quick processing of newer data and reliable, auditable storage of older data.

Linearly Scalable Consensus

The Data Backbone's consensus algorithm relies on a technology referred to herein as a Metablockchain, which is derived from blockchain technology. The Metablockchain differs from typical blockchains on two counts: 1) Most blockchains allow only one new Block of data to enter the blockchain at once. A Metablockchain allows an infinite number (bounded only by the constraints of a Participant's resources) of non-conflicting Metablocks to enter the Metablockchain simultaneously, and 2) Most blockchains encourage or require "full nodes" to store a complete history of the blockchain, which has been shown to reduce participation in the blockchain and not scale linearly in large networks of Participants. A Metablockchain requires its Participants to only store one previous generation of Metablocks in order to participate.

These features are made possible by a data structure called a Single-generation Independently Consolidated Directed Acyclic Graph (SIC-DAG). In a system with little activity, a SIC-DAG resembles a typical blockchain data structure with a conceptually linked-list of blocks. However, in a highly active system where many blocks are added simultaneously, the SIC-DAG can "fork" and add many blocks at the same time, eventually consolidating back into a linear data structure. This fork and consolidate mechanism enables a SIC-DAG to allow an unbounded number of Blocks to enter the graph at once, instead of only allowing one at a time, drastically improving parallelism in busy systems.

Distributed, Transactional Behavior Runtime

The Data Backbone provides a framework for defining, and a corresponding runtime for executing, complex distributed Distributed Applications comprised of Behaviors which consume and produce predetermined data types within the context of the Data Backbone.

Unlike conventional distributed systems, which require the direct management of the configuration, deployment, and versioning of Behaviors, the Data Backbone's Behavior runtime presents the underlying distributed system(s) as an opaque system. When a Behavior is created and deployed to any one Data Backbone Participant, it will automatically enter the Data Backbone and propagate to any Participant(s) that are involved with the predetermined data types which the Behavior consumes and/or produces.

Critically, Behaviors may be combined into transactional sequences of Behaviors called Sagas, which provide a guarantee that if one Behavior in the sequence of Behaviors fails, the entire set of operations performed by all Behaviors in the Saga will be reversed. This functionality is a common, but difficult problem to solve in distributed systems, and is achieved by leveraging the underlying data storage and consensus mechanisms of the Data Backbone.

BRIEF DESCRIPTION OF THE DRAWINGS

In the drawings, closely related figures and items have the same number but different alphabetic suffixes. Processes, states, statuses, and databases are named for their respective functions.

FIG. 6 shows a flowchart of how an Avatar processes a newly-observed Metablock.

FIG. 7 shows a representation of the pacts of a Saga Description, a Saga Stage, and a Saga State.

DETAILED DESCRIPTION, INCLUDING THE PREFERRED EMBODIMENT

Figure 1:
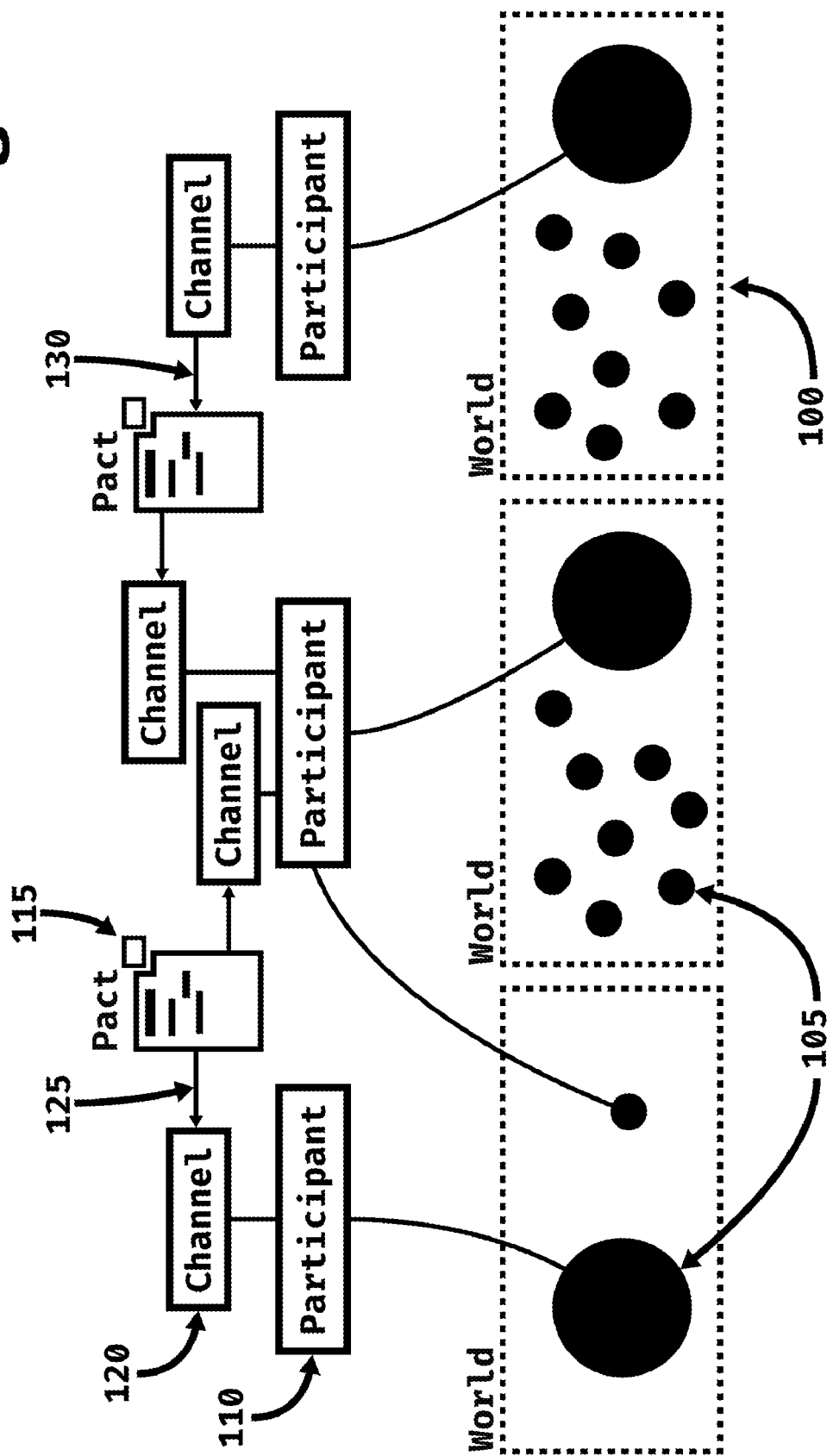
FIG. 1 shows a representation of the structure of a Data Backbone system.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

Avatar means any network representation of a Participant.

Behavior means any script, program, or application code which consumes, produces, modifies, and/or acts on data, and is capable of being executed as a part of a Distributed Application.

Block means any data structure containing an ordered sequence of Entries generated by a Participant.

Bound Behavior means any Behavior that may only be executed by Participants that meet a configurable criteria.

Channel means any connection to a Participant that allows for reading and writing Entries.

Confirmed Metablock means any Metablock which contains at least a predetermined number of Participant Digital Signatures.

DAG means Directed Acyclic Graph, a data structure consisting of connected nodes capable of representing parent, child, or sibling relationships without ever connecting back to themselves (e.g., nodes can never directly or indirectly be their own parents or their own children).

Data Backbone is a system that provides all of the functionality required to support a distributed application, including 1) data storage, 2) data consensus, 3) the ability to discover and access data regardless of its physical or logical location, 4) linear scalability (i.e., the performance of individual Data Backbone Participants does not significantly degrade in relation to the number of Participants in the Data Backbone), and 5) a runtime for executing complex distributed Distributed Applications.

Digital Signature means a reasonably unique collection of data resulting from the function of a cryptographic identity and an arbitrary collection of data, and which may later be verified via some method. A common example of such a signature-generating function, and corresponding signature-verifying method, is the Elliptic Curve Digital Signature Algorithm (ECDSA).

Distributed Applications are pre-defined processes or programs which may execute on one or more computers and/or systems in parallel, preferably in an orchestrated or coordinated way.

ECDH means Elliptic Curve Diffie-Hellman, which is a cryptographic key agreement protocol that allows two Peers to establish a shared secret over an untrusted network.

Entry means any structured sequence of data accessed by a Channel and defined by a Pact. Every Entry in a given Pact has an immutable and unique sequence number.

Final Saga State means a Saga State which was reached via the execution of the final Behavior in a Saga, or a Behavior which failed to execute (and is thus effectively the final Behavior in a Saga).

Gossip Protocol means a communication protocol whereby Peers in a system re-broadcast messages they receive, allowing information to spread from one end of the system to another.

Hash means the action or result of a one-way operation or function that converts an arbitrary collection of data into a unique sequence of bytes. Examples of hash functions include MD5 and SHA-256.

Local Storage means any internal, external, volatile, or persistent data storage system used by a Participant to store data.

Metablock means any data structure containing a number of Blocks, a number of References to other Metablocks, and the Digital Signatures of one or more Participants.

Metablockchain means any SIC-DAG wherein individual nodes are comprised of Metablocks generated by Avatars from the same World.

To observe means to create, receive, or transmit a data structure.

Pact means any data schema with a unique name that defines the format of an Entry.

Partial Saga State means a Saga State which was reached via the execution of any Behavior in a Saga, excluding the final Behavior in a Saga.

Participant means any Peer executing the Data Backbone software.

Peer means a process or system that participates in a networked distributed system.

Pending Saga State means a Partial Saga State for which there is no observed subsequent Partial Saga State or Final Saga State (e.g., a Pending Saga State may only exist if there is no observed "next" or "following" Partial Saga State or Final Saga State for the corresponding Saga Invocation).

Reference (when capitalized in the context of a data structure) means a data structure or data element which may be used to "look-up" or access another data structure or data element. A non-exhaustive list of examples of References includes literal copies of the data structure or data element being referenced, a unique sequence number or serial number, a Globally Unique Identifier (GUID), a Uniform Resource Locator (URL), and a Hash. This definition of Reference is preferred because References can be reasonably expressed in a variety of ways without substantially affecting any particular embodiment disclosed herein.

Saga means a specific Saga Description.

Saga Description means any Entry in a Saga Description Pact, which is a data structure further defined herein.

Saga Invocation means the unique collection of zero or more related Partial Saga States and zero or one related Final Saga State which collectively represent the complete (or partial, with errors) invocation of the Saga Stages in a Saga Description.

Saga Runtime means the complete set of computing instructions necessary to invoke a Saga Description and its Saga Stages.

Saga State means any Entry in a Saga Description-exclusive Saga State Pact, which is a data structure further defined herein.

Saga Stage means any Entry in a Saga Stage Pact, which is a data structure further defined herein.

SIC-DAG means Single-Generation Directed Acyclic Graph, which is a data structure further defined herein.

World means any named network of Avatars.

Operation

Figure 3:
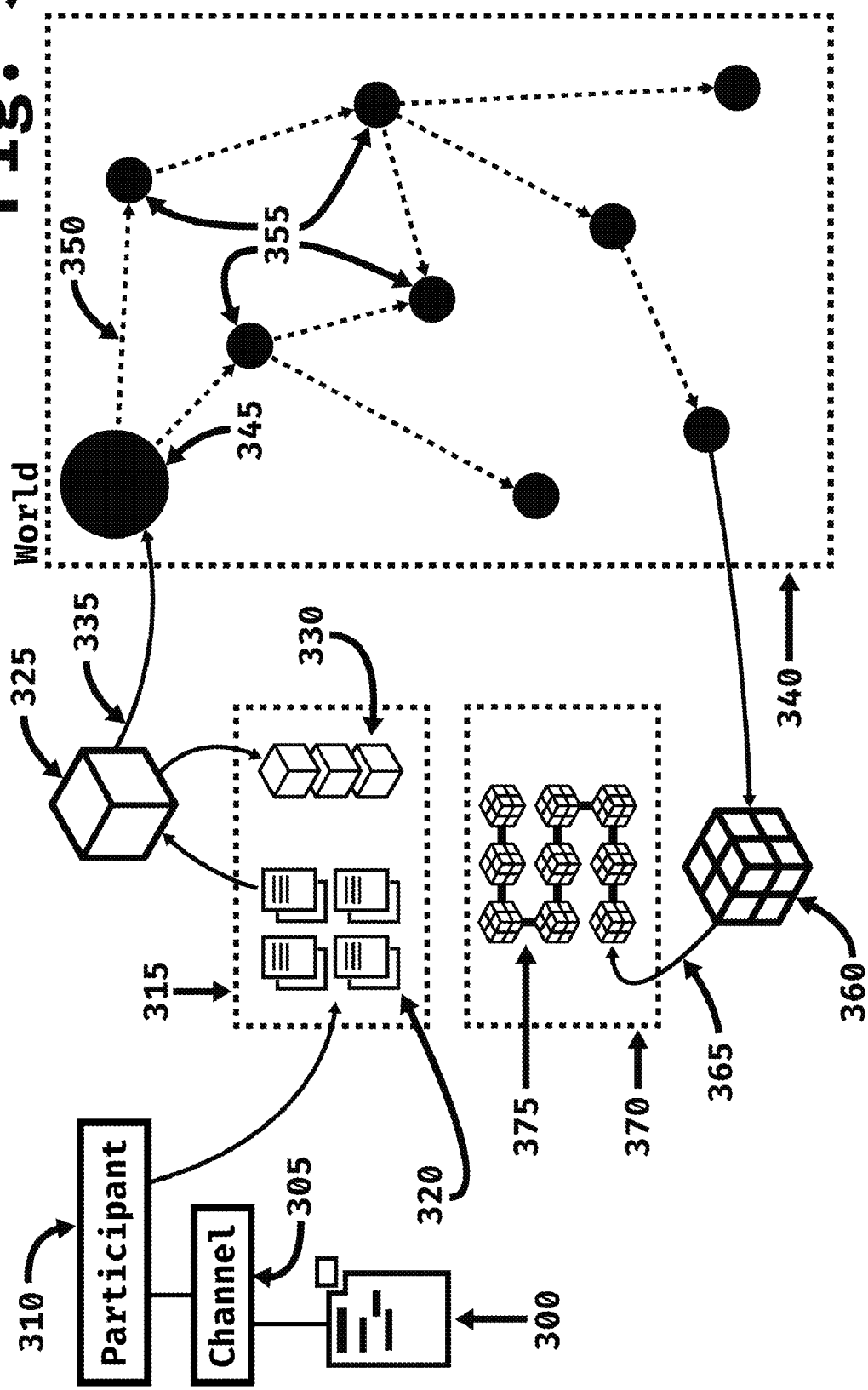
FIG. 3 shows a representation of the flow of data through a Data Backbone system.

Referring to FIG. 1, a preferred embodiment of the Data Backbone represents unique distributed systems as named networks called Worlds 100. Each World contains an arbitrary number of Avatars 105 which represent physical or virtual computing systems running the Data Backbone software called Participants 110. Each of these Participants may have an arbitrary number of Channels 120 connected to it which consume 125 data from or produce 130 data for one or more Pacts 115. The Data Backbone Dataflow (as illustrated in FIG. 3) ensures produced data eventually reaches all consumers of that data.

Each of these Participants resides on a computing device (e.g., a physical or virtual server running the Linux operating system; a personal computer running the Windows operating system or a smart phone running the Android operating system; or an embedded system like an Arduino or Raspberry Pi), and is implemented via a set of the computing instructions necessary to participate in a Data Backbone written using a widely available programming language (e.g., C/C++, Java, JavaScript, Python). In a preferred embodiment, a physical or virtual computing device running the Linux operating system is preferred for its widespread availability, and a set of computing instructions written using the Java programming language is preferred for its widespread adoption among software engineers and commercial enterprises.

In a preferred embodiment, multiple Participants may reside on the same computing device, but having only one Participant per computing device is preferred, as a one-to-one relationship of Participant and computing resources enables better utilization of computing resources. Further, Participants may be implemented via different sets of compatible computing instructions (e.g., implemented in different programming languages or implemented via multiple inter-connected sets of instructions), but implementing them via a single set of homogeneous instructions (e.g., a single "program") is preferred to limit the physical and performance costs of maintaining multiple interconnected sets of instructions.

In a preferred embodiment, Participant's Avatars and Saga Runtimes are implemented as a part of the same set of instructions used to implement the Participants themselves, and thus reside in the same set of instructions. This approach is preferred, as it limits the need to connect or combine the core components which enable a Participant to fully participate in a Data Backbone.

In a preferred embodiment, the computing device which a Participant resides on must have at least enough ephemeral storage (e.g., Random Access Memory or "RAM") connected to it for the Participant to create in-memory representations of its Avatars, its Pacts, these Pacts' Entry Buffers and corresponding Channels, and any additional data structures required for the Participant to participate in the Data Backbone.

In a preferred embodiment, the computing device which a Participant resides on must have at least enough durable storage (e.g., a Solid-State Hard Drive or "SSD", and/or a Hard-Disk Drive or "HDD") connected to it for the Participant to store its cryptographic identity, metadata about one or more of the Participant's Avatars (including the Avatar's cryptographic identity, one or more of the Avatar's Peer-Avatars, and at least one Metablock from the most recently confirmed generation of Metablocks in the Avatar's World), one or more Pacts accessed by the Participant, one or more Blocks created and/or observed by the Participant, and any additional data structures required for the Participant to participate in the Data Backbone.

Figure 2:
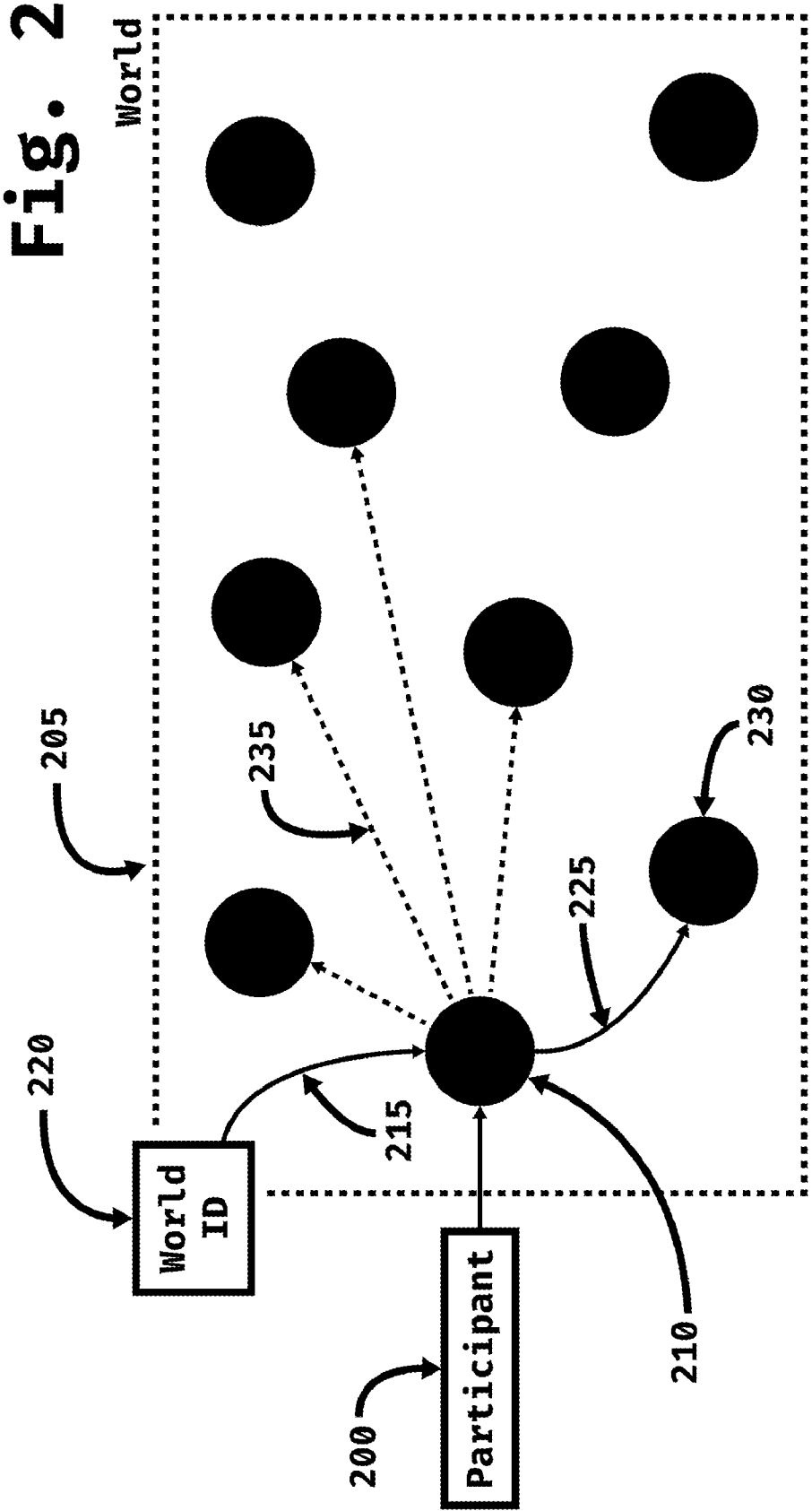
FIG. 2 shows a representation of the relationships between Avatars in a Data Backbone system.

Referring also to FIG. 2, when a Participant 200 interacts with a World 205 for the first time, the Participant creates a new Avatar 210 which has a unique cryptographic identity derived 215 from the private cryptographic or unique identifiers in the originating Participant and the World's unique identifier 220. The newly-created Avatar then exchanges 225 its identity with any other Avatar 230 in the World without exchanging the originating Participant's private identifiers or the World's unique identifier. If both the new Avatar and the other Avatar are able to confirm one-another's identities, the new Avatar joins the World and repeats this confirmation process with any other Avatars 235. Once the Avatar has joined the World, the Participant may reuse this Avatar for all future interactions with the World.

The precise mechanism for deriving a unique cryptographic identity and confirming the identity may be implemented in multiple ways using a variety of combinations of unique cryptographic or private information and cryptographic schemes (including Digital Signatures provided by trusted authorities in the World), depending on the requirements of the World. The present preferred embodiment uses a mechanism similar to an ECDH key agreement.

In regards to the creation and confirmation of new Avatars, there are only two invariants that must be met in a preferred embodiment of the Data Backbone: 1) The World's unique identifier must always remain private and never be exchanged by Participants, allowing it to be used as a simplistic form of "shared secret" (even if the World's unique identifier is publicly available out-of-band of the system itself), 2) A "confirming" Avatar 225 must be able to verify that the new Avatar's cryptographic identity 215 was created by the new Avatar's originating Participant 200.

This broad flexibility in terms of how cryptographic identities are derived, and how Avatars are created and confirmed, is important: As new vulnerabilities are discovered in existing cryptographic solutions, and new methods emerge, a preferred embodiment of the Data Backbone system should be flexible enough to adopt new cryptographic schemes without significantly changing the characteristics of the Data Backbone.

In a preferred embodiment, a World is merely a network formed by two or more Avatars created with the same shared secret (i.e., a World's unique identifier or "name"). Therefore, a new World is created implicitly when two or more Avatars connect to one-another using cryptographic identities derived from the same World name. Therefore, in a minimal implementation of a preferred embodiment, an arbitrary number of Worlds may be created by only two Participants, which in turn create an arbitrary number of Avatars derived, in part, from an arbitrary (but shared) collection of World names, bounded only by the physical resources available to each Participant. Further, this implicit creation of Worlds eliminates the requirement for a centralized World "orchestrator" or "manager", as membership in a World is determined by agreement between individual Avatars.

In a preferred embodiment, the connections between Avatars (and their Participants, if the Avatars and their Participants reside on separate systems) may be achieved over the public internet or over a private internet connection. Any connection which utilizes Internet Protocol Version 4 ("IPV4") or Internet Protocol Version 6 ("IPV6") is preferred (due to their widespread adoption), and a connection which further uses the Transmission Control protocol ("TCP") is preferred for its reliable transmission of packets across the internet. An embodiment may also use the User Data Protocol ("UDP") in place of TCP to achieve higher throughput (e.g., to "stream" Blocks between Avatars), at the risk of packet loss and data corruption. If two Participants reside on the same computing device instead of separate computing devices, their Avatars may still communicate via IPV4/IPV6 and/or TCP/UDP. Avatars which reside on a computing device incapable of using IPV4/IPV6 and/or TCP/UDP may also utilize "lower-level" communication protocols such as the Recommended Standard 232 ("RS-232") serial communication protocol.

Referring also to FIG. 3, a preferred embodiment of the Data Backbone is comprised of one or more Worlds 340 containing one or more Avatars 355 of one or more Participants 310 which are connected to by one or more Channels 305 which access one or more Pacts 300. For every Pact a Participant or its Channels access, the Participant establishes a Local Storage system 315 containing an Entry Buffer 320 and a Block Stack 330.

When created, every Avatar establishes a unique Metablockchain 375 in a local cache 370. Avatars may exist on the same logical or physical system as their corresponding Participant (in which case the local cache may be instantiated within the Participant's Local Storage), or on a separate system (in which case a new local cache can be instantiated). If more than one Avatar is created on the same physical system for the same Participant and World combination, the Avatars may share a local cache or instantiate and use their own, new local caches.

Channels connect to Participants, which in turn map the Channels to specific Entry Buffers based on the Pact that the Channel accesses. It is possible for Channels to exist on other systems than the Participant, on the same system as the Participant, or even in the same process as the Participant. Each Entry Buffer is a data structure with a configurable maximum size of Entries it may store and the ability to be written to and read from multiple parallel or concurrent processes. The Entry Buffer allows multiple Channels to write to and read from the Pact concurrently or in parallel, enabling efficient manipulation of Entries within the same Participant.

In a preferred embodiment, Channels may be implemented as an internal Application Programming Interface ("API") which a Participant exposes to other software instructions residing within the Participant's instruction set (e.g., its Avatars, Behaviors, or other coroutines), and optionally via a web service (e.g., a Hyper Text Transfer Protocol, or "HTTP", server) which non-Participants (e.g., external processes or human operators) may use to read from and write to Channels.

When an Entry Buffer reaches a configurable level of utilization of its maximum capacity (e.g., when it becomes 90% full or when it contains enough Entries to create a desired size of Block), the Entries in the Entry Buffer are moved to a new Block 325. This Block is placed into the Entry Buffer's corresponding Block Stack 330, signed by the Avatar's corresponding Participant, and relayed 335 to the Participant's Avatars 345. When the Avatars receive the Block, they will validate the Digital Signature within the Block, and then make a pre-defined or configurable Avatar-specific decision as to which of their Peer-Avatars to transmit the Block to 350. The sharing mechanism of Blocks follows a Gossip Protocol, resulting in new Blocks eventually propagating across any World the Block is shared to.

In a preferred embodiment, a Participant's Entry Buffers are ephemeral data structures stored in an ephemeral resource (e.g., RAM) connected to the computing device which the Participant resides on. Further, in the preferred embodiment, a Participant's Block Stacks are durable data structures stored in a durable resource (e.g., a HDD or SSD) connected to the computing device which the Participant resides on.

When an Avatar observes a configurable level of new Blocks, it creates a new Metablock 360 containing References to all the new Blocks it has observed, along with the Hashes of all the Metablocks from the most recently confirmed generation of Metablocks. This Metablock is then placed in the Avatar's Metablockchain 365 and broadcast to its Peer-Avatars for consensus via their own Metablockchains 350. Similarly to Blocks, the sharing of Metablocks follows a Gossip Protocol.

In a preferred embodiment, an Avatar's Metablockchain is an ordered collection of one or more related Metablocks stored in a durable resource (e.g., SSD or HDD) connected to the computing device which the Avatar resides upon.

Figure 4:
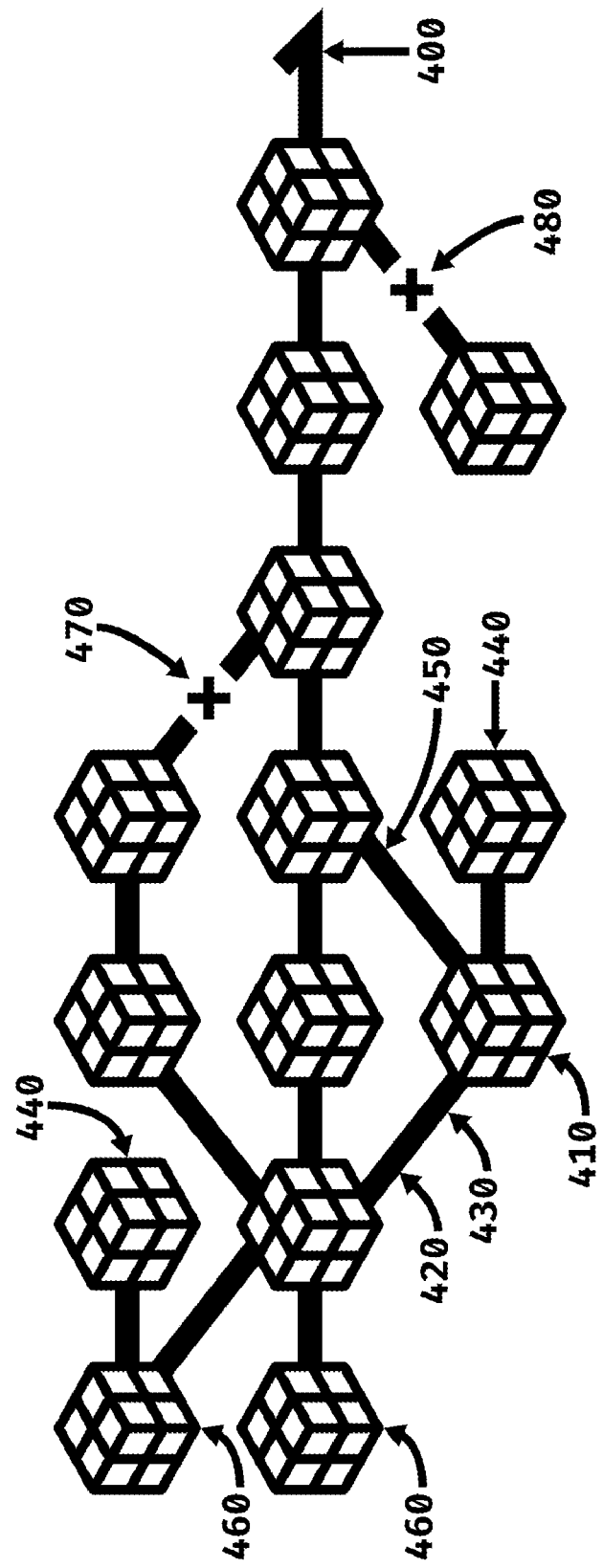
FIG. 4 shows a representation of the structure of a Single-generation Independently Consolidated Directed Acyclic Graph (SIC-DAG).

Referring also to FIG. 4, a Single-generation Independently Consolidated Directed Acyclic Graph (SIC-DAG) is a Directed Acyclic Graph (DAG) where each node with the sequence number N will have one or more nodes in the SIC-DAG with sequence number N−1 as parents, causing the SIC-DAG to converge towards a linear list of nodes 400 during each generation.

Each node 410 in the SIC-DAG is linked 420 to the previous set of parent nodes that its creator was aware of at the time of creation. When two nodes are created at similar times with one or more of the same parent nodes with the same sequence number, it is possible for the SIC-DAG to temporarily fork 430 and resemble a conventional DAG. When such a fork occurs, nodes that are not directly linked to the next generation of nodes will be orphaned and abandoned 440 and nodes that are linked will merge into the history of the SIC-DAG 450.

The following invariants must be met in the preferred embodiment of a SIC-DAG: 1) Each node must contain a sequence number N in the range 0 to infinity, 2) With the exception of the genesis nodes 460 (with N=0), each node with sequence number N must contain the Hashes of one or arbitrarily more valid nodes with sequence number N−1, and 3) No two nodes with the same sequence number N may have their Hashes included in the same node with sequence number N+1 if they contain conflicting or potentially conflicting data (where conflict is defined by the specific embodiment of the SIC-DAG).

Nodes which contain the Hash of a parent with N−1, which in turn contains the Hash of a parent with N−2 whose Hash was not contained in any other nodes in the generation N−1, are not permitted to enter the SIC-DAG 470. Likewise, nodes which contain the Hash of a parent with N−1, which in turn does not contain the Hash of any valid nodes with N−2 are also not permitted to enter the SIC-DAG 480. These properties ensure only nodes which refer to parent nodes known to exist in the SIC-DAG will be included in the current generation, reducing the likelihood of long-lived "forks" of the SIC-DAG.

So long as these invariants are met, the embodiment of a SIC-DAG may be implemented in a variety of ways. The SIC-DAG contained in the preferred embodiment of the Data Backbone system is referred to as a Metablockchain, as it is a SIC-DAG where each node is a Metablock.

Figure 5:
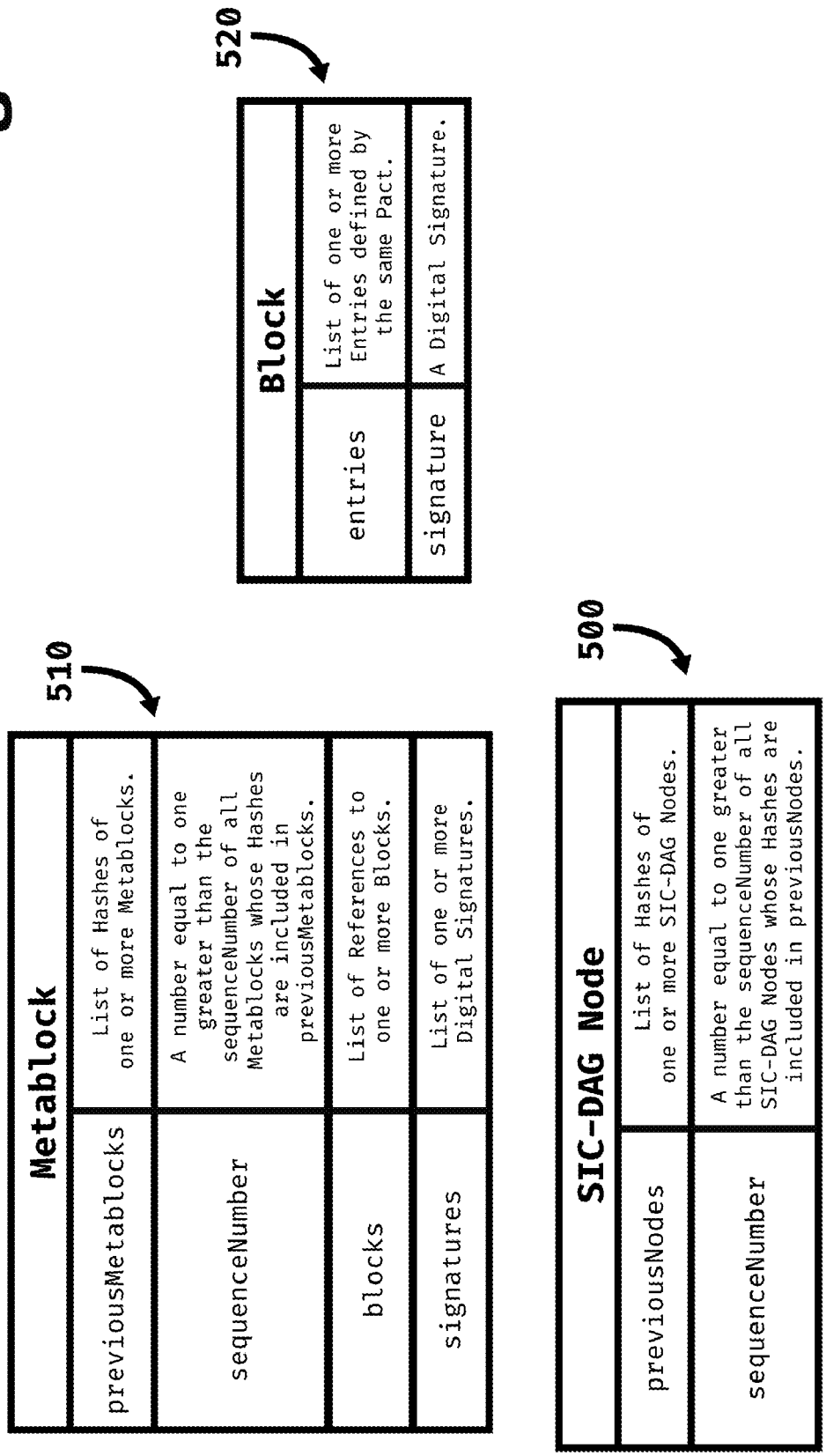
FIG. 5 shows a representation of the schemas of a SIC-DAG Node, a Metablock, and a Block.

Referring also to FIG. 5, a minimal SIC-DAG Node 500 is comprised of a list of Hashes of one or more other SIC-DAG Nodes, and a sequence number equal to one greater than the sequence number of all SIC-DAG Nodes whose Hashes are contained in the SIC-DAG Node. A Metablock 510 is a SIC-DAG Node additionally comprising a list of References to one or more Blocks, and a list of one or more Digital Signatures provided by Participants whose Avatar's have observed (e.g., created, received, and/or transmitted) the Metablock. A Block 520 is comprised of a list of one or more Entries defined by the same Pact, and a Digital Signature provided by the Participant who created the Block.

A Metablockchain adheres to all the invariants of a SIC-DAG, with the following additional invariants: 1) Each Metablock must contain the Digital Signature of one or more Participants, and References to one or more Blocks, 2) No two Digital Signatures may originate from the same Participant, 3) No two Block References may refer to the same Block, or to a pair of Blocks which contain conflicting or potentially conflicting data, 4) With the exception of genesis Metablocks (with N=0), no Metablock with sequence number N may exist if no Metablock with sequence number N−1 exists with at least Q Digital Signatures (where Q is a predetermined number of Digital Signatures to achieve quorum in a Data Backbone), and 5) Every Metablock with sequence number N−1 whose Hash is contained in a Metablock with sequence number N must contain at least Q Digital Signatures. A Metablock with at least Q Digital Signatures is referred to as a Confirmed Metablock.

Referring also to FIG. 6, when a Participant's Avatar receives a Metablock with sequence number S 600, and S=N or S=N+1 (where N is the highest sequence number of all Confirmed Metablocks an Avatar has observed) 605, the Metablock's contents are validated by the Avatar 610. If the Metablock is validated successfully, the Avatar checks if the Metablock has been observed by the Avatar before and already been signed by its Participant 615. If the Metablock has not been observed before, it will be checked for conflicts with any other Metablocks with a sequence number equal to S previously observed by the Avatar 620 (this step is skipped if this is the first Metablock with sequence number S the Avatar has observed). If the Metablock has no conflicts with other previously observed Metablocks, the Metablock is signed by the Avatar's Participant and appended with the resulting Digital Signature 625, stored in the Avatar's Metablockchain 630, and re-broadcast to the Avatar's Peer Avatars 635.

If an Avatar successfully validates a Metablock 610 which has been signed by its Participant in the past 615, the Avatar will check if the Metablock has more Digital Signatures than the current version of the Metablock which the Avatar has in its Metablockchain 645. If the Metablock does have more Digital Signatures, the Avatar will replace the version it has in its Metablockchain 630, and re-broadcast the new Metablock to the Avatar's Peer Avatars 635.

In all other cases (e.g., when an Avatar receives a Metablock with an out-of-range sequence number S 605, when an Avatar receives an invalid Metablock 610, when an Avatar receives a Metablock its Participant has already signed, but the Metablock has no additional signatures 645, or when the Avatar receives a Metablock that conflicts with another Metablock with the same sequence number S 620), the Metablock is discarded.

The Data Backbone system provides a framework and runtime for the execution of Behaviors and sequences of Behaviors called Sagas. Each Participant in the Data Backbone contains a Saga Runtime capable of executing these Sagas.

Referring also to FIG. 7, Sagas are defined by a unique Entry in a Saga Description Pact shared by all Sagas. Every Saga in a World has at least one Entry in the Saga Description Pact, and must define its own corresponding Pact comprising the fields of the Saga State Pact that is unique to that Saga.

Every Entry in the Saga Description Pact is a Saga Description 700 that, at a minimum, contains an ordered list of References to Entries in the Saga Stage 710 Pact, a Reference to the Pact which initiates the Saga, and a Reference to the Saga's corresponding Saga State Pact. The first referenced Saga Stage in the Saga must consume the initiating Pact of the Saga, where "consume" means the Saga Stage's Behavior is capable of processing one or more Entries described by the Pact, and optionally is capable of "producing" (creating) one or more Entries as the result of this processing, which are described by the same Pact and/or one or more different Pacts.

Every Entry in the Saga Stage Pact is a Saga Stage 710 that, at a minimum, contains a Reference to a Behavior, a Reference to the Pact consumed by the Behavior (and thus the Pact consumed by the Saga State), a list of References to zero or more Pacts which are accessed (read) by the Saga Stage's Behavior, and a list of References to zero or more Pacts which are produced (written) to by the Saga Stage's Behavior.

Every Entry in a Pact comprising a Saga State Pact is a Saga State 720 that, at a minimum, contains a Reference to the previous Entry (Saga State) in that Saga State's corresponding Saga Invocation (if it is not the first Partial Saga State for a Saga Invocation), a Reference to the Saga Description that was invoked to produce that Saga State, a Reference to the Saga Stage that was invoked to produce that Saga State, a Reference to the Entry that was consumed by that Saga Stage, and a list of zero or more References to the Entries produced (created) by that Saga Stage.

Figure 8:
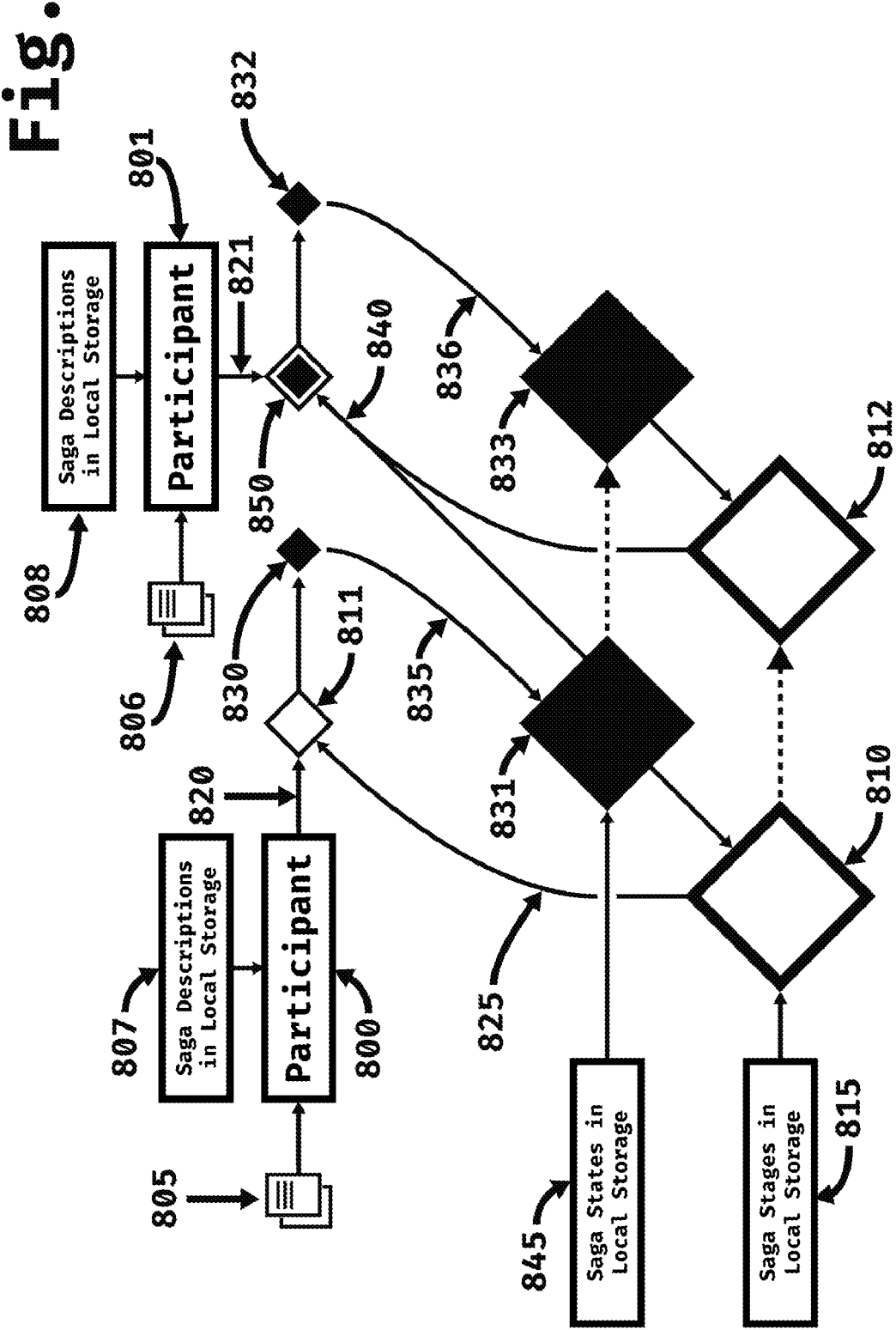
FIG. 8 shows a representation of the lifecycle of a Saga Description, its Saga Stages, and its Saga States.

Referring also to FIG. 8, when a Participant 800 observes a new Entry 805 which is in the initiating Pact of a Saga Description that the Participant has in its Local Storage 807, the Participant invokes the Saga Description with that Entry 820 via the Saga Runtime. The Saga Runtime then retrieves 825 the first Saga Stage 810 from the Saga Stages in Local Storage 815 and invokes it with an empty (new) Saga State 811 and passes it the Entry 805 observed by the Participant 800. When the Saga Stage completes executing, the Saga Runtime produces a new Saga State 830 which is stored 835 as a Saga State Entry 831 in the Saga States in Local Storage 845.

When a Participant 801 contains a Pending Saga State 831 in its Local Storage 845 for which it has a corresponding Saga Description in its Local Storage 808, and it receives a new Entry 806 which is consumed by the next Saga Stage 812 to invoke for that combination of Pending Saga State and Saga Description, the Participant invokes 821 the Saga Description with the Entry 806 via the Saga Runtime. The Saga Runtime then retrieves 840 the Pending Saga State 831 from its Saga States in Local Storage 845 and the next Saga Stage 812 from its Saga Stages in Local Storage 815. The Saga Runtime then invokes the Saga Stage with the Pending Saga State 850. When the Saga Stage completes executing, the Saga Runtime produces a new Saga State 832 which is stored 836 as a Saga State Entry 833 in the Saga States in Local Storage 845.

Because a Saga Description is comprised of multiple sequential Saga Stages where each intermediary Saga State is stored on the Data Backbone, complex Saga Descriptions which trigger a "blocking" event (e.g., waiting a pre-determined amount of time, or making a request to a remote system) may be implemented as a sequence of Saga Stages, where one Saga Stage makes a request, and the next Saga Stage is initiated by a response to the request. This asynchronous functionality means a Saga may be executed wholly on one Participant, or by multiple Participants. As illustrated in FIG. 8, there is no requirement that one Saga Description be executed wholly by the Saga Runtime of one Participant. Because a particular Saga Invocation may be executed over a long or indefinite period of time, possibly in the presence of multiple network partitions or failures, Pending Saga States may be long-lived and/or used to detect and resolve timeouts in a Saga.

Regardless of how it was invoked, every Saga Stage uses the Channels described in the Data Backbone Dataflow (as illustrated in FIG. 1) to both consume Entries from and produce Entries to Pacts. This means that individual Saga Stages do not require any specialized mechanisms or implementation consideration to read, create, or distribute Entries. Further, because all of a Saga's components (e.g., Saga Stages and Saga Stages) are defined by and stored within Entries for Pacts, they are automatically stored and distributed as a part of the Data Backbone Dataflow (as illustrated in FIG. 1), allowing every invocation of a Saga to be "replayed" and for every unique state and version of a Saga to be recalled. These qualities mean that implementers of Sagas may achieve auditable "event sourcing" functionality with little to no additional configuration, and will benefit from any extensions to the performance or capabilities of the underlying Data Backbone without additional configuration.

Other Embodiments

The Data Backbone system may be extended to allow individual Pacts or Sagas to "prefer", recognize, or otherwise be bound to Participants running on physical or virtual systems with certain properties (e.g., general-purpose input-output interfaces, network sockets, or even more complex features like robotic arms or drivetrains). Extending the Data Backbone system in this way allows users of the system to create more advanced applications that ensure data and Sagas are stored and executed on systems capable of supporting them.

In the preferred embodiment, every Participant runs the same Data Backbone software. However, this software can be coded in a wide range of programming languages, split into an arbitrary number of components and/or objects, and implemented as an arbitrary number of subroutines or coroutines.

A Participant's Local Storage system may be implemented in a variety of ways using a variety of techniques and technologies (including, for example, modern databases like MongoDB or Oracle RDBMS and modern in-memory data grids like Hazelcast or Memcached), so long as the Local Storage system maintains the ability to be accessed concurrently by multiple Channels connected to the Participant. Channels may be implemented in such a way that they are on different systems, on the same system, or even in the same process as the Participant they are connected to.

The mechanisms by which Avatars exchange data can be implemented in a variety of ways using a variety of techniques and technologies (including, for example, modern messaging systems like Kafka, Protocol Buffers, or lightweight TCP, IP, or RS-232 connections), so long as the Avatars maintain the ability to verify one another's identities and exchange data relevant to the Data Backbone.

The specific data structures and names of Pacts, Entries, Blocks, Metablocks, and Sagas (and any related data structures) may be drastically modified—so long as they approximate the qualities described in the figures—without departing from the spirit of the method and system disclosed herein. In fact, some of these data types could even be combined without fundamentally altering the characteristics of the Data Backbone.

The specific mechanism by which individual Saga Stages are executed could be implemented in a wide range of ways, using a variety of scheduling, serialization, and execution techniques. At the discretion of the Data Backbone runtime and/or the Saga Descriptions, a Saga State could be specific to a particular invocation of a Saga Description (e.g., a transaction state), it may be persistent across all invocations of the Saga Description (e.g., an actor state), or some combination thereof (e.g., a state associated with a unique identifier). Further, Saga Stages may be extended to declare "compensating" or "reversal" Saga Stages which refer to other Saga Stages which should be invoked when a Saga Stage in a Saga fails or times out, and requires all prior Saga Stages to be undone or compensated for in order to maintain a consistent Saga State.

The specific nature, structure, and capabilities of the schemas described by Pacts may be extended or implemented to include a wide range of features. For example, Pacts may support "inheritance", which is a common requirement for systems that rely on "extensions" of the same fundamental datatype. Furthermore, the mechanisms by which Channels or users of the Data Backbone system query Pact data are many; for example, a GraphQL or SQL-based query language may be built on top of or into the Pact structure.

As developing technologies update or modify mechanisms used for consensus and conflict resolution, similar modifications may be made to the structure of the Metablockchain or the SIC-DAG that retain the general characteristics of the system—the ability for any Participant or Peer to participate with only knowledge of one "generation" of node data, and for an arbitrary number of nodes to enter the same generation simultaneously. For example, a mechanism for detecting and resolving conflicts within two nodes in a Metablock-based SIC-DAG (i.e., a Metablockchain) would be to include logical clocks (e.g., Lamport Clocks or Vector Clocks), allowing the newer or older Metablocks (depending on a configurable policy) to always "win" in a conflict. Further, these consensus rules could be stored within a dedicated Pact that all Participants read from and write to, providing a method of changing or updating a consensus policy without a "hard fork" of the Data Backbone.

The properties of Channels and Entries could be extended to implement the interfaces or fulfill the contracts of reactive or functional programming interfaces, e.g. ReactiveX (and its children projects, RxJava, RxJs, etc.).

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data backbone system comprising:
   one or more computing devices, wherein each computing device has memory, storage, a processor, a local storage of the computing device, and software stored on non-transient computer-readable media programming the computing device to:
   operate as a participant within the data backbone;
   operate a saga runtime to execute one or more behaviors;
   create an avatar for a specific world based on a unique identifier of the specific world and a private cryptographic identifier of the participant;
   exchange an identity of the avatar with a different identity of a different avatar already joined to the specific world;
   confirm the different identity of the different avatar;
   create a unique metablockchain;
   connect to one or more channels which access one or more pacts;
   for each accessed pact, establish an entry buffer and a block stack within the local storage, and allow the connected channel of the accessed pact to read from and write to the entry buffer;
   move one or more entries from the entry buffer into a new block, place the new block in the block stack, sign the new block with a digital signature of the participant, and propagate the new block across the specific world by transmitting to one or more peer avatars;
   create a new metablock with References to one or more observed Blocks;
   place the new metablock in the unique metablockchain;
   broadcast the new metablock to the specific world;
   receive a metablock;
   when a received sequence number of the received metablock is the same as or one more than a highest sequence number of all confirmed metablocks in the unique metablockchain:
     validate the received metablock;
     when the received metablock validates successfully:
       when the received metablock has not previously been observed:
         check the received metablock for conflicts with other metablocks having a same sequence number as the received sequence number;
         when there are no conflicts:
           sign the received metablock with the digital signature of the participant;
           store the received and signed metablock in the unique metablockchain;

rebroadcast the received and signed metablock to the one or more peer avatars;

when the received metablock had been previously observed and signed with the digital signature of the participant:

compare the received metablock with the previously observed metablock in the unique metablockchain for amount of digital signatures;

when the compared amount of digital signatures is greater for the received metablock, replace the previously observed metablock with the received metablock in the unique metablockchain and rebroadcast the received metablock to zero or more peer avatars;

when the received metablock is not stored in the unique metablockchain, discard the received metablock;

observe a new entry in an initiating pact of a saga description stored within the local storage;

invoke the saga description with the new entry through the saga runtime;

retrieve a first saga stage from one or more saga stages in the local storage, invoke the first saga stage with an empty saga state and pass the new entry to the first saga stage;

when the first saga stage completes executing, produce a new saga state as a saga state entry and store the saga state entry in the local storage;

contain a pending saga state with a corresponding saga description in the local storage;

receive a different new entry which is consumed by a next saga stage when invoked for the pending saga state and the corresponding saga description;

invoke the corresponding saga description with the different new entry through the saga runtime;

retrieve the pending saga state and the next saga stage;

invoke the next saga stage with the pending saga state;

when the next saga stage completes executing, produce a different new saga state as a different saga state entry and store the saga state entry in the local storage;

wherein the unique metablockchain is a single-generation independently created directed Acyclic Graph (SIC-DAG);

wherein each metablock in the unique metablockchain is a node in the SIC-DAG;

wherein each node in the SIC-DAG contains a sequence number equal to or greater than 0 wherein one or more genesis nodes in the SIC-DAG contain the sequence number 0;

wherein each non-genesis node with a non-genesis sequence number greater than 0 contains hashes of one or more valid prior generation nodes having a prior generation sequence number of one less than the non-genesis sequence number of the non-genesis node and such that the one or more valid prior generation nodes do not contain conflicting or potentially conflicting data;

wherein each metablock contains one or more digital signatures of one or more different participants, and one or more references to one or more different blocks which do not contain conflicting or potentially conflicting data;

wherein each metablock with a confirming predetermined number or greater of digital signatures is treated as a confirmed metablock;

wherein each hash in a non-genesis node metablock is of a confirmed metablock;

wherein each saga in the specific world has at least one entry in a saga description pact, and a corresponding pact corresponding to a corresponding saga comprising fields of a saga state pact unique to the corresponding saga;

wherein every entry in the saga description pact contains:
an ordered list of references to entries in the saga stage pact;
a reference to a pact which initiates a specific saga; and
a reference to the saga state pact corresponding to the specific saga;

wherein every entry in the saga stage pact is a saga stage that contains:
a reference to a behavior;
a reference to a pact consumed by the behavior;
a list of references to zero or more pacts accessed by the behavior; and
a list of references to zero or more pacts produced by the behavior; and wherein every entry in the saga state pact is a saga state that contains:
a reference to a previous entry if the saga state is not a first Partial saga state;
a reference to a saga description invoked to produce the saga state;
a reference to a saga stage invoked to produce the saga state;
a reference to an entry consumed by the saga stage; and
a list of zero or more references to one or more entities produced by the saga stage.

2. A data backbone system comprising:

one or more computing devices, wherein each computing device has memory, storage, a processor, a local storage of the computing device, and software stored on non-transient computer-readable media programming the computing device to:

operate as a participant within the data backbone;

operate a saga runtime to execute one or more behaviors;

create an avatar for a specific world based on a unique identifier of the specific world and a private cryptographic identifier of the participant;

exchange an identity of the avatar with a different identity of a different avatar already joined to the specific world;

confirm the different identity of the different avatar;

create a unique metablockchain;

connect to one or more channels which access one or more pacts;

for each accessed pact, establish an entry buffer and a block stack within the local storage, and allow the connected channel of the accessed pact to read from and write to the entry buffer; and move one or more entries from the entry buffer into a new block, place the new block in the entry buffer, sign the new block with a digital signature of the participant, and propagate the new block across the specific world by transmitting to one or more peer avatars;

wherein:
the unique metablockchain is a single-generation independently created directed Acyclic Graph (SIC-DAG);
each metablock in the unique metablockchain is a node in the SIC-DAG;

17 each node in the SIC-DAG contains a sequence number equal to or greater than 0;
  one or more genesis nodes in the SIC-DAG contain the sequence number 0;
  each non-genesis node with the sequence number greater than 0 contains hashes of one or more valid prior generation nodes having the sequence number of 1 less than the sequence number of the non-genesis node and such that the one or more valid prior generation nodes do not contain conflicting or potentially conflicting data;
  each metablock contains one or more digital signatures of one or more different participants, and one or more references to one or more different blocks which do not contain conflicting or potentially conflicting data;
  each metablock with a predetermined number or greater of digital signatures is treated as a confirmed metablock; and
  each hash in a non-genesis node metablock is of a confirmed metablock; and
wherein the software is further programming the computing device to:
receive a metablock;
when the sequence number of the received metablock is the same as or one more than a highest sequence number of all confirmed metablocks in the unique metablockchain:
  validate the received metablock;
  when the received metablock validates successfully:
    when the received metablock has not previously been observed:
      check the received metablock for conflicts with other metablocks having the same sequence number as the received sequence number;
      when there are no conflicts:
        sign the received metablock with the digital signature of the participant;
        store the received and signed metablock in the unique metablockchain; and
        broadcast the received and signed metablock to the one or more peer avatars;
    when the received metablock has been previously observed and signed by the digital signature of the participant:
      compare the received metablock with the previously observed metablock in the unique metablockchain for an amount of digital signatures;
      when the compared amount of digital signatures is greater for the received metablock, replace the previously observed metablock with the received metablock in the unique metablockchain and broadcast the received metablock to zero or more peer avatars; and
  when the received metablock is not stored in the unique metablockchain, discard the received metablock.

3. A data backbone system comprising:
one or more computing devices, wherein each computing device has memory, storage, a processor, a local storage of the computing device, and software stored on non-transient computer-readable media programming the computing device to:
operate as a participant within the data backbone;
operate a saga runtime to execute one or more behaviors;
observe a new entry in an initiating pact of a saga description stored within the local storage;

18 invoke the saga description with the new entry through the saga runtime;
retrieve a first saga stage from one or more saga stages in the local storage, invoke the first saga stage with an empty saga state and pass the new entry to the first saga stage; and
when the first saga stage completes executing, produce a new saga state as a saga state entry and store the saga state entry in the local storage.

4. The system of claim 3, wherein the software is further programming the computing device to:
contain a pending saga state with a corresponding saga description in the local storage;
receive a new entry which is consumed by a next saga stage when invoked for the pending saga state and the corresponding saga description;
invoke the corresponding saga description with the new entry through the saga runtime;
retrieve the pending saga state and the next saga stage;
invoke the next saga stage with the pending saga state; and
when the next saga stage completes executing, produce a new saga state as a saga state entry and store the saga state entry in the local storage.

5. The system of claim 4, wherein:
each saga in the specific world has at least one entry in a saga description pact, and a pact corresponding to the saga comprising fields of a saga state pact unique to the saga;
every entry in the saga description pact contains:
  an ordered list of references to entries in the saga stage pact;
  a reference to a pact which initiates a specific saga; and
  a reference to the saga state pact corresponding to the specific saga;
every entry in the saga stage pact is a saga stage that contains:
  a reference to a behavior;
  a reference to a pact consumed by the behavior;
  a list of references to zero or more pacts accessed by the behavior; and
  a list of references to zero or more pacts produced by the behavior; and
every entry in the saga state pact is a saga state that contains:
  a reference to a previous entry if the saga state is not a first Partial saga state;
  a reference to a saga description invoked to produce the saga state;
  a reference to a saga stage invoked to produce the saga state;
  a reference to an entry consumed by the saga stage; and
  a list of zero or more references to one or more entities produced by the saga stage.

6. A method of operating a data backbone comprising:
operating one or more computing devices having memory, storage, a processor, and a local storage of the computing device;
operating software on one of the computing devices to act as a participant within the data backbone;
operating a saga runtime to execute one or more behaviors;
creating an avatar for a specific world based on a unique identifier of the specific world and a private cryptographic identifier of the participant;

exchanging an identity of the avatar with a different identity of a different avatar already joined to the specific world;
confirming the different identity of the different avatar;
creating a unique metablockchain as a single-generation independently created directed Acyclic Graph (SIC-DAG);
connecting to one or more [channels which access one or more pacts;
for each accessed pact, establishing an entry buffer and a block stack within the local storage, and allowing the connected channel of the accessed pact to read from and write to the entry buffer;
moving one or more entries from the entry buffer into a new block, placing the new block in the entry buffer, signing the new block with a digital signature of the participant, and propagating the new block across the specific world by transmitting to one or more peer avatars;
processing each metablock in the unique metablockchain as a node in the SIC-DAG;
assigning to each node in the SIC-DAG a sequence number equal to or greater than 0;
assigning to one or more genesis nodes in the SIC-DAG the sequence number 0;
requiring that each non-genesis node with the sequence number greater than 0 contains hashes of one or more valid prior generation nodes having the sequence number of 1 less than the sequence number of the non-genesis node and such that the one or more valid prior generation nodes do not contain conflicting or potentially conflicting data;
requiring that each metablock contains one or more digital signatures of one or more different participants, and one or more references to one or more different blocks which do not contain conflicting or potentially conflicting data;
treating each metablock with a predetermined number or greater of digital signatures as a confirmed metablock;
requiring that each hash in a non-genesis node metablock is of a confirmed metablock;
receiving a metablock;
when the sequence number of the received metablock is the same as or one more than a highest sequence number of all confirmed metablocks in the unique metablockchain:
  validating the received metablock;
  when the received metablock validates successfully:
    when the received metablock has not previously been observed:
      checking the received metablock for conflicts with other metablocks having the same sequence number as the received sequence number;
      when there are no conflicts:
        signing the received metablock with the digital signature of the participant;
        storing the received and signed metablock in the unique metablockchain; and
        broadcasting the received and signed metablock to the one or more peer avatars;
    when the received metablock has been previously observed and signed by the digital signature of the participant:
      comparing the received metablock with the previously observed metablock in the unique metablockchain for an amount of digital signatures;
      when the compared amount of digital signatures is greater for the received metablock, replacing the previously observed metablock with the received metablock in the unique metablockchain and broadcasting the received metablock to zero or more peer avatars; and
    when the received metablock is not stored in the unique metablockchain, discarding the received metablock.

7. A method of operating a data backbone comprising:
operating one or more computing devices having memory, storage, a processor, and a local storage of the computing device;
operating software on one of the computing devices to act as a participant within the data backbone;
operating a saga runtime to execute one or more behaviors;
observing a new entry in an initiating pact of a saga description stored within the local storage;
invoking the saga description with the new entry through the saga runtime;
retrieving a first saga stage from one or more saga stages in the local storage, invoking the first saga stage with an empty saga state and passing the new entry to the first saga stage; and
when the first saga stage completes executing, producing a new saga state as a saga state entry and store the saga state entry in the local storage.

8. The method of claim 7, further comprising:
storing a pending saga state with a corresponding saga description in the local storage;
receiving a new entry which is consumed by a next saga stage when invoked for the pending saga state and the corresponding saga description;
invoking the corresponding saga description with the new entry through the saga runtime;
retrieving the pending saga state and the next saga stage;
invoking the next saga stage with the pending saga state; and
when the next saga stage completes executing, producing a new saga state as a saga state entry and storing the saga state entry in the local storage.

9. The method of claim 8, further comprising:
requiring each saga in the specific world to have at least one entry in a saga description pact, and a pact corresponding to the saga comprising fields of a saga state pact unique to the saga;
containing in every entry in the saga description pact:
  an ordered list of references to entries in the saga stage pact;
  a reference to a pact which initiates a specific saga; and
  a reference to the saga state pact corresponding to the specific saga;
containing in every entry as a saga stage in the saga stage pact:
  a reference to a behavior;
  a reference to a pact consumed by the behavior;
  a list of references to zero or more pacts accessed by the behavior; and
  a list of references to zero or more pacts produced by the behavior; and
containing in every entry as a saga state in the saga state pact:
  a reference to a previous entry if the saga state is not a first Partial saga state;
  a reference to a saga description invoked to produce the saga state;

a reference to a saga stage invoked to produce the saga state;
a reference to an entry consumed by the saga stage; and
a list of zero or more references to one or more entities produced by the saga stage.

\* \* \* \* \*